Patented Sept. 17, 1929

1,728,681

UNITED STATES PATENT OFFICE

FRIEDRICH JOHANNSEN, OF CLAUSTHAL-ON-THE-HARZ, GERMANY, ASSIGNOR TO THE FIRM FRIED. KRUPP GRUSONWERK AKTIENGESELLSCHAFT, OF MAGDEBURG-BUCKAU, GERMANY

TREATMENT OF SULPHIDE ORES OR SULPHIDIC METALLURGICAL PRODUCTS

No Drawing. Application filed May 28, 1925, Serial No. 33,507, and in Germany May 30, 1924.

This invention relates to the treatment of sulphide ores or sulphidic metallurgical products which contain volatilizable metals such as zinc, lead, tin, bismuth, arsenic, antimony etc. It is known to treat such sulphide materials so as to obtain an oxide "flue dust" of the volatilizable metals. The dry treatment of such materials was hitherto carried out in two stages. First the material was roasted with the formation of sulphur-dioxyde, $SO_2$, and of metal oxides or metal sulphates. The further treatment of the roasted material consisted in a reduction with which was associated a volatilization and, following this, oxidation of the metals adapted to this process. In this way, a rich oxide "flue dust" was obtained. Although the process of roasting is exothermic, in the case of poor materials however a considerable consumption of fuel is required, and in this case especially the extraction or the rendering harmless of the sulphurous acid involves great expense. The necessity of rendering harmless the sulphurous acid and the working in two separate operations, both of which require considerable quantities of fuel and power and involve considerable expense are substantial drawbacks of this divided process.

In order to overcome these disadvantages the raw sulphide was decomposed in another manner with the addition of sulphur fixing material, e. g. in a muffle, substantially in accordance with the equation

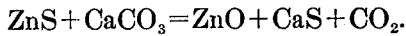

$$ZnS + CaCO_3 = ZnO + CaS + CO_2.$$

There was also accomplished, with simultaneous admixture of reducing material, the further decomposition of the metal oxides formed, the metals being volatilized and condensed in suitable apparatus. These distillation processes have the common disadvantage that the furnace room must be carefully closed to prevent the entrance of air or hot gases, which must be accomplished by the heating of the container from the outside or by the use of an electrical energy for heating. This requires naturally a large amount of fuel or electrical energy and a high cost of the apparatus used.

Finally it is known to treat such materials in a shaft furnace, the material being mixed with fuel and sulphur fixing substances and being melted in recovering the zinc. In these known processes the heat necessary for carrying out the reaction is produced by blowing air through a column of the charge formed of the material to be treated and fuel, the necessary quantity of fuel being burned. Although by this method a saving of fuel as compared with the above mentioned distillation processes is attained, nevertheless, it has other important disadvantages. For example it is impossible in view of the intimate contact between the air and the sulphides in the charge, even with a large surplus of reducing material, to prevent a partial roasting of the sulphides, so that in the waste gases considerable quantities of $SO_2$ are present. On the other hand, in a shaft furnace the charge comes out in melted condition so that in choosing the character and quantity of the sulphur fixing substances a careful consideration for the proper mixture of the charge to permit the melting of the material is required.

The present invention has for its object to eliminate the disadvantages above referred to, whilst retaining the advantages of the known processes.

According to the present invention a process for the conversion of sulphide ores or sulphidic metallurgical products containing volatilizable metals to an oxide "flue dust" of these metals consists in decomposing the sulphides in one operation at a high temperature, without previously roasting them, in such manner that the volatilization of the metals and the combination of the sulphur with the residue is simultaneously effected. The oxidation of the metallic vapours is then effected immediately afterwards. By means of the new process the oxidation of the sulphides is avoided, their decomposition being carried out in a neutral or reducing atmosphere. In this way, the process is greatly simplified and cheapened. Owing to the fixing of the sulphur in the residue, it becomes unnecessary to have recourse to operations and the expenditure involved thereby which hitherto were required for rendering harmless the waste gases.

The precise method of carrying out the process, as well as the kind and quantity of the additional materials that may be required to be added depends on the composition of the material treated and on the kind of the furnace used for carrying out the process. In any case the raw sulphide is mixed with reducing material, such as for example coke fines, and exposed to a high temperature. The quantity of the reducing substance is calculated so that in the body of the material itself the atmosphere is a reducing one, whilst in the surroundings of the particles of the material at least a neutral atmosphere is maintained, so that oxidation of the sulphur is avoided. Moreover, for the purpose of fixing the sulphur in a heat-resisting form, alkaline earth compounds are added, if they are not already present in the raw material, or the sulphur is fixed in a heat-resisting form, for instance as a sulphide of a heavy metal. The quantity of these additions is calculated so that practically the whole of the sulphur which is not combined with heavy metals such as iron and copper, is converted into a sulphide of an alkaline earth. In carrying out the process in practice it is preferable to work with an excess of an alkaline earth so as to effect the complete decomposition of the sulphides. The use of high temperatures (for instance 1250–1400° C.) is advantageous, as experience shows that the reaction is thereby accelerated. It is essential however to avoid liquefaction of the charge in the volatilization zone, and for this purpose there must be added if necessary refractory substances such as for example alumina, silicic acid, or lime stone. If small quantities of sulphur should go over in the gases, for example the second S atom of pyrites, the $SO_2$ will be oxidized to $SO_3$ and combined to form metal sulphates by the finely divided metal oxide particles in the gases, so that even in the case of pyrites occurring in the ore etc., practically no free sulphur dioxide will be present in the gases passing off.

If considerable quantities of heavy spar (barium sulphate) are present in the raw material, they are reduced to barium sulphide within the charge, during the course of the process, so that in the residue barium sulphide is present. It is desirable, in this case, to prevent a subsequent oxidation of the barium sulphide at the furnace discharge, by carrying out the discharging of the material from the furnace in such a manner that the residues do not come into contact with fresh air, before they are cool. One is then in a position to lixiviate the cooled residue with water and to recover most of the barium in the ore in the form of barium sulphide solution.

As already remarked, the process is not confined to any special kind of furnace, provided that no free oxygen is present in the immediate vicinity of the particles of the charge and that for the decomposition of the sulphides and the fixing of the sulphur a sufficient quantity of alkaline earth compounds is present and that finally, whilst avoiding melting the temperature is maintained high enough to ensure a practically useful speed of reaction. The manner of heating depends on the kind of the furnace and the fuel available, and must be therefore adjusted to the local conditions. It may be effected for instance by adding the requisite quantity of fuel corresponding to the amount of material to be treated or by using burnt flame gases. Both methods of heating could also be used simultaneously, and also an additional heating, for instance by means of a coal dust flame, which can be employed during the initial heating up and later and for a given time or throughout the operation

What I claim is:

1. Process for the recovery of easily volatilizable metals such as zinc, lead, tin, bismuth, arsenic, antimony, etc. from sulphide ores, metallurgical products and residues by treating in the presence of sulphur fixing and reducing substances characterized by the fact that the material together with the said substances is charged into a furnace, and is subjected therein to a direct heating, the quantity of the reducing and sulphur fixing substances being so measured that a reducing atmosphere exists in the reaction zone in the immediate vicinity of the reacting particles of the charge, the sulphides being decomposed and the formed oxides being reduced with the release of the volatilizable metals and the sulphur remaining fixed in the residue, while the volatilized metals after leaving the layer are oxidized in the furnace and then recovered as flue dust, the melting of the charge in the reaction zone being prevented as far as possible.

2. Process in accordance with claim 1 in which the sulphur fixing substance is refractory in character.

3. Process in accordance with claim 1 in which the sulphur fixing substance is refractory and basic in character.

4. Process in accordance with claim 1 in which the sulphur fixing substance is an alkaline earth compound.

5. Process in accordance with claim 1 in which the sulphur fixing substance is limestone.

6. Process in accordance with claim 1 in which the sulphur fixing substance is refractory in character and is added in excess of the chemical requirements of the charge.

In testimony whereof the foregoing specification is signed.

FRIEDRICH JOHANNSEN.